United States Patent
Sivathanu et al.

(10) Patent No.: US 7,536,521 B2
(45) Date of Patent: May 19, 2009

(54) COMPUTER STORAGE DEVICE PROVIDING IMPLICIT DETECTION OF BLOCK LIVENESS

(75) Inventors: Muthian Sivathanu, Madison, WI (US); Andrea C. Arpaci-Dusseau, Madison, WI (US); Remzi H. Arpaci-Dusseau, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 415 days.

(21) Appl. No.: 11/535,757

(22) Filed: Sep. 27, 2006

(65) Prior Publication Data
US 2007/0101054 A1 May 3, 2007

Related U.S. Application Data

(60) Provisional application No. 60/721,260, filed on Sep. 28, 2005.

(51) Int. Cl.
*G06F 13/00* (2006.01)
(52) U.S. Cl. .................. 711/156; 711/205; 711/210
(58) Field of Classification Search .................. 711/156, 711/205, 210
See application file for complete search history.

(56) References Cited

U.S. PATENT DOCUMENTS

| 5,592,669 A * | 1/1997 | Robinson et al. ............ 707/206 |
| 6,085,298 A * | 7/2000 | Ohran ........................ 711/162 |
| 6,236,593 B1 * | 5/2001 | Hong et al. ............ 365/185.11 |
| 2003/0028720 A1 | 2/2003 | Lam et al. |
| 2005/0154582 A1 | 7/2005 | Kortenoeven et al. |

FOREIGN PATENT DOCUMENTS

WO  WO 00/03320  1/2000

OTHER PUBLICATIONS

International Search Report of PCT/US2006/038001.
Sivathanu et al., Improving Storage System Availability with D-GRAID, Third USENIX Symposium on File and Storage Technologies (FAST '04), Apr. 2004.

* cited by examiner

Primary Examiner—Reba I. Elmore
(74) Attorney, Agent, or Firm—Boyle Fredrickson, S.C.

(57) ABSTRACT

A disk drive or similar storage medium uses a semantic understanding of its associated file system to monitor file metadata and derive block liveness normally only known by the file system. Knowledge of block liveness can be used to improve the disk performance and to create a disk that provides for secure deletion without explicit instructions from the file system.

24 Claims, 3 Drawing Sheets

COMPUTER STORAGE DEVICE PROVIDING IMPLICIT DETECTION OF BLOCK LIVENESS

CROSS-REFERENCE TO RELATED APPLICATIONS

This application claims priority to Provisional Application Ser. No. 60/721,260 filed on Sep. 28, 2005 entitled "Computer Storage Device Providing Implicit Detection of Block Liveness" and which is incorporated herein.

STATEMENT REGARDING FEDERALLY SPONSORED RESEARCH OR DEVELOPMENT

This invention was made with United States government support awarded by the following agencies: NSF 0098274. The United States has certain rights in this invention.

BACKGROUND OF THE INVENTION

The present invention relates to computer storage devices such as, but not limited to, magnetic disk drives, and in particular to a computer storage device that implicitly determines whether blocks of the storage device are alive.

Computer storage devices, such as disk drives, store the data of logical data files in one or more blocks defined on a storage medium. The mapping of the data of the logical data files to the blocks is normally done by a "file system" being a program running as part of the computer operating system. The interface between the file system and the computer storage device is normally "narrow" providing only simple block-level read instructions and block-level write instructions, each indicating a block number and whether data is to be read from the block or written to the block.

When a logical data file is deleted, the blocks that were used by the data file are left unchanged on the storage medium and overwritten on an individual basis only when a given block is later required to store the data of a different data file. This approach avoids unnecessary activity by the storage device (in erasing blocks on the storage medium), but is a problem when computers are used in sensitive or classified environments, for example, by the government or businesses handling confidential information such as consumer credit or healthcare information. The data of deleted data files can be recovered from the storage medium simply by reading those blocks that have not yet been overwritten by later stored data files.

A "secure" deleting of data files, that is, a deletion that eliminates both the logical data file and that erases the data of the data file stored on the storage medium, can be implemented by modifying the file system to erase blocks (by overwriting the blocks with an obscuring pattern) whenever the logical data file associated with the blocks is deleted. Currently, the common file systems used by the vast majority of computers (e.g., the file systems associated with the Windows and Linux operating systems) do not provide this feature. Third-party tools exist today that claim to perform secure deletion by adding extensions to the file system, but such tools are fundamentally unreliable for the reasons below:

True secure delete for magnetic disks requires "off-track writes", that is, a writing of data on either side of track boundaries—something that requires control of disk hardware not normally available to the file system through its narrow interface with the disk. True secured deletion may also require multiple overwrites of the blocks with different patterns of data. If such multiple overwrites of a block are implemented by the file system, the storage device may buffer these repeated instructions in non-volatile RAM and collapse them to a single write defeating the intended purpose. Finally, some storage devices flexibly remap the blocks designated by the file system to different physical blocks on the storage medium ("block migration"). An overwrite of a free block by the file system may be redirected to a different block leaving stray copies of deleted data.

Conceivably, current standard file systems could be rewritten to allow secure deletion and the interfaces of storage devices could be redesigned so that the file system could perform the necessary low-level control of the storage device. Such a coordinated, parallel modification of software and hardware, in order to accommodate an initially small group of users requiring secure deletion, is unlikely.

BRIEF SUMMARY OF THE INVENTION

The present inventors have recognized that a currently limited number of different types of file systems makes it possible that a storage device could be invested with knowledge of specific file system semantics. This knowledge would allow the storage device to read and interpret file system "metadata" stored on the storage device indicating whether data of a particular block has been deleted.

Once the storage device can determine the "liveness" of a block (that is, whether it has data associated with a current data file), the storage device may independently implement a secure deletion routine provide off-track writing and multiple overwrites ("shredding") that require low-level hardware control. This implementation by the storage device does not require a change to the disk interface and requires no or little change to the file system.

The information about block liveness may further allow the storage device to implement a wide variety of disk optimization techniques including, but not limited to, more efficient writing and reading of block data and off-line optimization of the storage device.

Specifically then, the present invention provides a computer storage device for use with a file system managing logical data files. The computer storage device includes a storage medium having a plurality of blocks storing data and metadata, where the metadata maps data of the logical data files to blocks. The computer storage device also includes an interface accepting block read and block write instructions from the file system. A controller identifies metadata stored on the storage medium and from that metadata, determines whether blocks are live. The controller then uses this liveness information to improve the performance or security of the storage device.

Thus it is one aspect of at least one embodiment of the invention to allow the storage device to evaluate liveness of block data implicitly, without the need to modify the interface used on such devices or to make significant modifications to the file system.

The controller, in determining whether blocks are live, may supplement the metadata with data inferred from write instructions to particular blocks. For example, the controller may determine that a block is live when is there is a write of data to the block even after receipt of metadata indicating that the block is dead.

Thus it is another aspect of at least one embodiment of the invention to eliminate the possibility of accidentally erasing blocks based on stale metadata.

The controller may shred a block to erase previous data of the block when the controller determines that the block has become dead.

Thus it is an aspect of at least one embodiment of the invention to provide a secure delete disk that may interface with standard computer systems and that requires little or no modification to the file systems.

The controller may determine that a logical file associated with a block has changed and may save the data of the given block, then shred the block and rewrite the save data to the given block.

Thus it is another aspect of at least one embodiment of the invention to allow for the shredding of all blocks associated with a file even when the blocks are reallocated before refreshing of the metadata.

The controller, after rewriting the saved data, may perform a second shredding of the given block before a subsequent writing of data to the given block.

It is thus another aspect of at least one embodiment of the invention to provide a system that can accommodate an arbitrary number of reallocations of the block between refreshing of the metadata while ensuring secure destruction of the initial deleted data.

It is thus another aspect of at least one embodiment of the invention to limit rewriting of the data when there is certainty that the data has been previously shredded.

The controller may remap a writing of data associated with an instruction from a block designated by the instruction to a different block determined by the controller to be live and having lower latency. The block with lower latency may, for example, be a block that is closer to the disk read head than the block designated by the instruction, or closer to a block previously allocated to the file so as to prevent fragmentation.

Thus it is another aspect of at least one embodiment of the invention to use the liveness information obtainable by the storage device for other low level optimization of the storage device.

The controller may avoid caching blocks that are not live as determined by the controller.

It is thus another aspect of at least one embodiment of the invention to allow for faster caching of data by eliminating dead blocks from the transmission of the data.

The computer storage device may be a RAID system having multiple independent disk drives.

Thus it is an aspect of at least one embodiment of the invention to work with both single and multiple disk drives.

When the storage medium is a RAID system, the controller may reorganize data among the multiple independent disk drives based on the determination by the controller as to which blocks of the multiple independent disk drives are live.

Thus it is an aspect of at least one embodiment of the invention to allow sophisticated restructuring of RAID drives, for example, from RAID-I to RAID-5 as the RAID space is used.

The interface may further accept "free" instructions and the media access circuit may respond to the free instructions to shred a block designated in the free instructions.

Thus it is another aspect of at least one embodiment of the invention to provide a storage medium that facilitates migration to an explicit model of communicating liveness information.

The computer system may include a monitor for monitoring changes of the liveness of data indicating a security problem.

It is thus another aspect of at least one embodiment of the invention to use the information obtained by the present invention to provide additional levels of computer security.

The computer system may include a plurality of file system semantic templates describing the storage of metadata by different file systems, and the controller may identify metadata stored on the storage medium based on a selected file system semantic template.

Thus it is an aspect of at least one embodiment of the invention to provide a storage unit that may be flexibly used on a variety of common file system types.

These particular aspects and advantages may apply to only some embodiments falling within the claims and thus do not define the scope of the invention.

DETAILED DESCRIPTION OF THE PREFERRED EMBODIMENT

Figure 1:
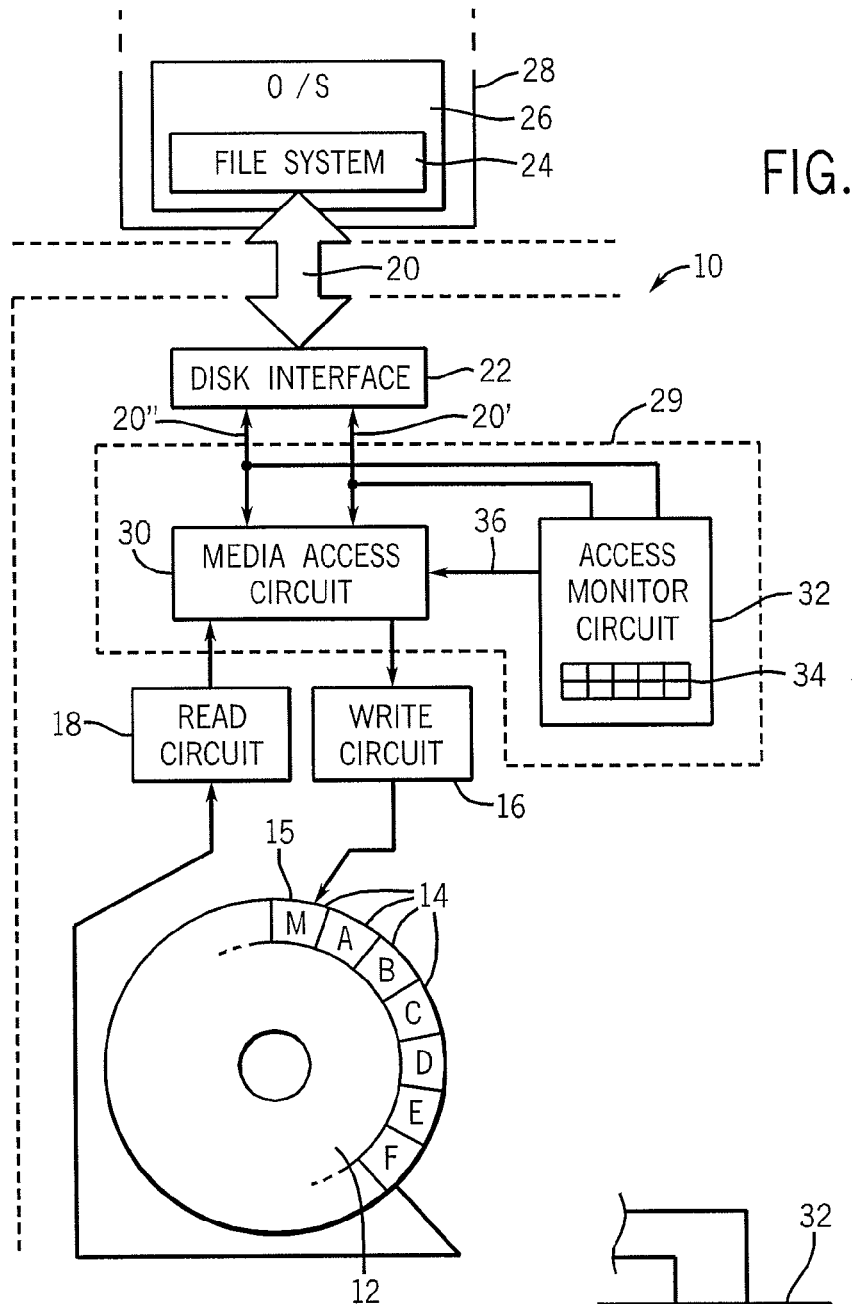
FIG. 1 is a block diagram of the present invention showing a controller implementing a media access circuit interposed between a disk interface communicating with a file system and the READ and WRITE circuit communicating with the storage medium, the media access circuit working with a access monitor circuit also implemented by the controller to modify reading and writing of the storage medium based on a deduction of the liveness of the blocks of the storage media by the controller.

Referring now to FIG. 1, a storage device 10 suitable for use with the present invention provides a storage medium 12 organized to hold data in a series of blocks 14. Storage medium 12 may be a magnetic disk or other storage medium allowing storage of data organized into blocks including, but not limited to, magnetic tape and optical disk drives and the like.

A WRITE circuit 16 may write data to the blocks 14 and a READ circuit 18 may read data from the blocks. Generally, the READ circuit 18 and WRITE circuit 16 operate by reading the position of the storage medium 12, for example, rotation of the disk, and moving a read/write head (not shown) over the surface of the storage medium 12 to align with the particular block 14 from which data is being read or to which data is being written.

The WRITE circuit 16 and READ circuit 18 are controlled by instructions 20 received at interface 22. The interface 22 is generally a narrow, block-based interface receiving principally either read instructions providing a block number and an instruction to read the data from that block or write instructions providing data and a block number to which that data should be written.

The instructions 20 are received from a file system 24 being part of an operating system program 26 of a computer 28. Generally, the file system 24 organizes data in logical data files that may be accessed through the operating system program 26 and maps the data of the logical data files to particular blocks 14 on the storage medium 12. When a file is saved, the file system 24 provides instructions 20 to write the file data to particular blocks 14. Conversely, when a file is read, the file system 24 issues instructions 20 requesting the reading of particular blocks 14. The data of the read block is assembled by the file system 24 to produce the logical data file. Normally the file system 24 includes some buffering so that when a logical data file is changed, the blocks 14 are not immediately updated.

Information about how the data of the logical data files are mapped to blocks 14 is stored as metadata managed by the file system 24. The file system 24 periodically writes the metadata 15 to the storage medium 12, in this example as block M, along with the data of the logical data file stored in one or more of blocks A through F. In this figure and in the following examples, the number of blocks are limited for clarity. The metadata 15 provides information about the mapping of logical data files to particular blocks 14 but may also include other information, for example, about which blocks 14 are live, dates of modification of the block, and the like.

The metadata 15 will normally varying in format and location with different file systems 24. However, most file systems 24, in their metadata, have logical "free list" structures indicating which blocks 14 are being used and logical "index structures" mapping each logical file to groups of blocks (e.g. inodes). Further, the inventors have recognized that a limited number of different file systems are in fact in common use, particularly in many applications where the present invention will be most useful. These file systems include ext2 and ext3 used by the Linux operating system, and the VF A T file system also used by Linux and analogous to the file system used in Windows operating system computers. This limited universe of common file systems 24 makes it possible for the storage device 10 to identify the particular file system 24 and be responsive to its particular semantics, and thereby to read the metadata 15 stored on its storage medium 12 to determine block liveness information as will be described.

Referring still to FIG. 1 in the present invention, the above-described elements of FIG. 1, which are generally understood to those of ordinary skill in the art, are supplemented by a liveness-aware controller 29 providing a media access circuit 30 and an access monitor circuit 32 interposed between the disk interface 22 and the WRITE circuit 16 and READ circuit 18.

The media access circuit 30 and access monitor circuit 32 may be implemented in the controller normally used in the storage device 10 by providing additional programming or additional circuitry. While the media access circuit 30 and access monitor circuit 32 are shown as independent elements in order to clarify their functions, they may be implemented with shared circuitry and/or programming.

The media access circuit 30 modifies the response of the WRITE circuit 16 and READ circuit 18 to read and write instructions 20 per access modification commands 36 from an access monitor circuit 32. The access monitor circuit 32 monitors write instructions 20' and read instructions 20" to capture and interpret metadata 15 and to generate through a set of maintained data structures, aliveness table 34 providing information about the liveness of particular blocks 14 on the storage medium 12.

Figure 2:
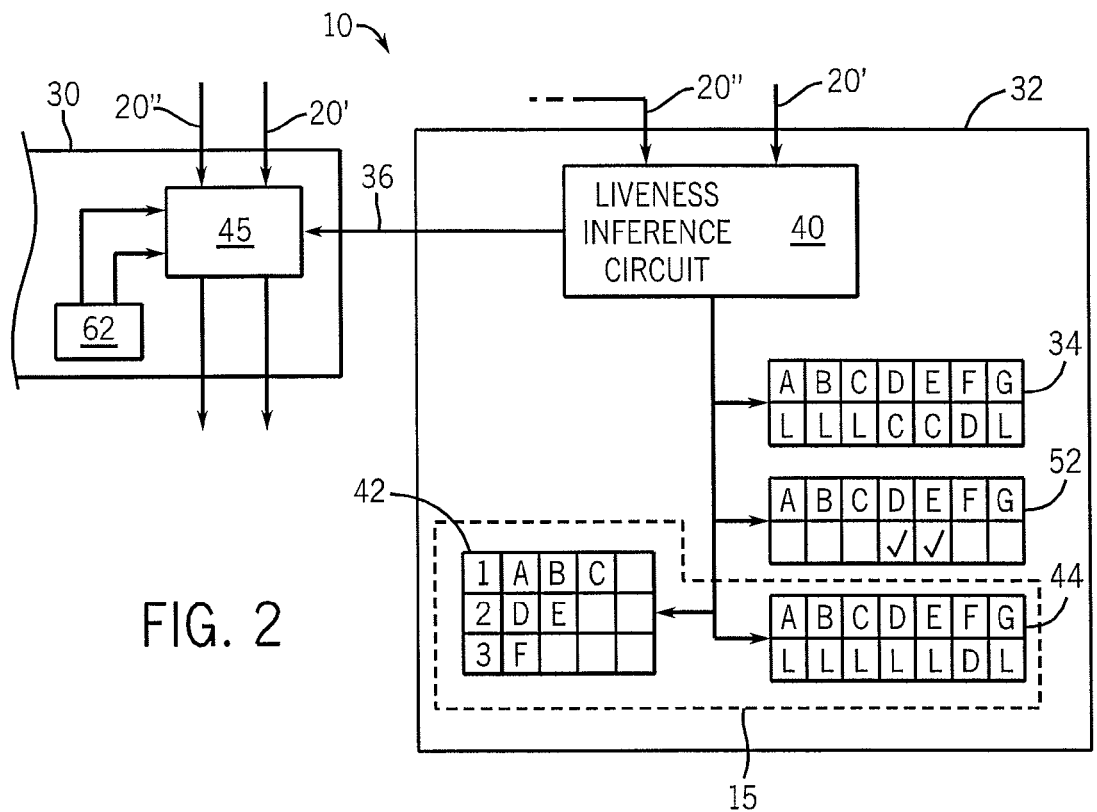
FIG. 2 is detailed fragmentary view of the media access circuit and the access monitor circuit of FIG. 1 showing a buffer of the media access circuit for delay in executing block shredding instructions and showing data structures (including metadata) used by the access monitor circuit to infer liveness of the blocks.

Referring now to FIGS. 1 and 2, specifically, the access monitor circuit 32 provides a liveness inference circuit 40 invested with knowledge of the particular file system 24 to monitor write instructions 20' and capture and store the metadata 15 within the access monitor circuit 32. As mentioned, the metadata 15 includes an index table 42 (or the equivalent information) relating logical data files, in this example identified simply by integers 1,2 and 3, to particular blocks 14 holding the data of those files identified in this example by the letters A-F. Thus, in this example, the data of logical data file 1 is held in blocks A, B and C, the data of logical file 2 in blocks D and E, and the data of logical data file 3 in block G.

The metadata 15 also includes a free list 44 (or the equivalent information) showing which blocks 14 have been allocated to files and thus are live, indicated in this example by the letter L, or dead (not allocated to a file), indicated in this example by the letter D for each of the blocks A-G.

The liveness inference circuit 40 identifies the metadata of index table 42 and free list 44 using the same rules that would be used by the file system 24 and, when the metadata 15 is updated by the file system, the liveness inference circuit 40 updates the index table 42 and free list 44. In the simplest embodiment, the liveness inference circuit 40 is specific to a particular file system 24 and the storage device 10 is provided for use only with that file systems 24. As will be described below, however, the storage device 10 may be able to work with multiple file systems 24 using file systems semantic templates.

The liveness inference circuit 40 uses free list 44 and index table 42 to create a liveness table 34 that provides more current, and additional information over index table 42 or free list 44. The liveness table 34 marks each block either live (indicated here by a letter L), or dead (indicated with a letter D), or changed (indicated by a letter C).

Initially, the liveness table 34 is matched to the free list 44 as first downloaded by the file system 24 to the storage device 10. The liveness inference circuit 40 then updates the liveness table 34 whenever a block is written to the storage medium 12 that would indicate that a block marked as dead in free list 44 was in fact live under the assumption that the free list 44 had not yet been updated on the storage device 10.

The liveness inference circuit 40 further monitors index table 42 in between updates by the file system to identify blocks 14 that have changes in their affiliation to a logical data file. All blocks 14 associated with a new logical data file since the last update of the index table 42 are marked changed. The change of affiliation of a block 14 to a logical data file may also be captured for changes in version numbers of an index table entry, where for example, the same index table entry is reused for a different logical data file, or a logical data file is partially deleted or "truncated" Thus the liveness table 34 provides an indication of whether a block is live, changed, or dead.

The liveness inference circuit 40 further creates and manages a suspicious block table 52 providing an identification of particular blocks 14 as will be described below.

Figure 3:
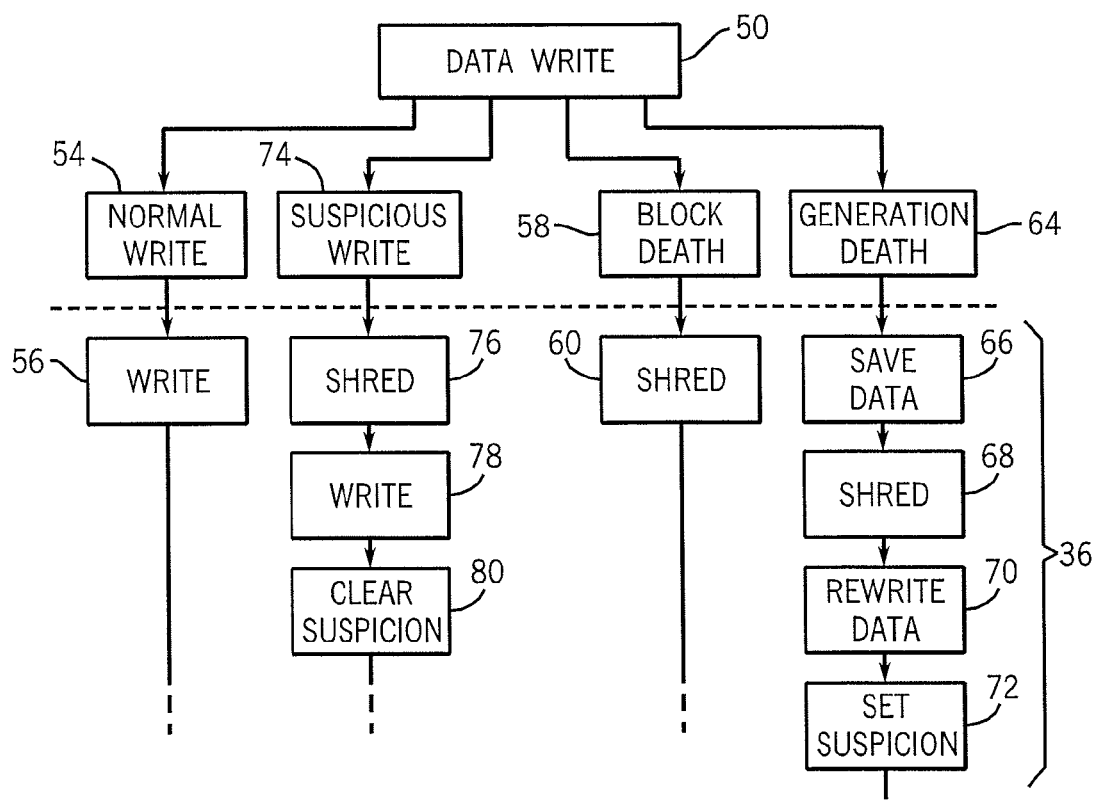
FIG. 3 is a flow chart showing the steps implemented by the access monitor circuit of FIG. 2 and the media access circuit upon different inferences from the metadata.

Referring now to FIGS. 2 and 3 based on the liveness table, the liveness inference circuit 40 issues access modification commands 36 to a read/write modification circuit 45 that controls the passage of read instructions 20" and write instructions 20' to the WRITE circuits 16 and READ circuit 18. In one embodiment, the access modification commands 36 may be used to implement a secure delete feature in the storage device 10 in which blocks 14, that are no longer used, are securely deleted so as to be unrecoverable at a later date.

As shown in FIG. 3 in this application, the liveness inference circuit, upon receiving a write instruction 20' as indicated by process block 50, may issue one of four access modification commands 36 to the read/write modification circuit 45 based on the information in the liveness table 34 and the suspicious block table 52 as will be described below.

The simplest access modification command 36 indicated by process block 54 is a normal write command which causes the read/write modification circuit 45 simply to perform the write as instructed by the file system 24. The normal write command occurs when the liveness inference circuit 40 determines by the liveness table 34 that the block 14 to be written is a dead block, or if the block 14 is a live block that is not marked suspicious (as detailed below). In this case, the read/write modification circuit 45 causes the WRITE circuit 16 to write the data per the write instruction 20' as indicated by process block 56.

The read/write modification circuit 45, receiving the write instruction 20', simply writes the data to the block 14 (by issuing a command to the WRITE circuit 16), and the liveness inference circuit 40 updates the free list 44, indicating that the block 14 is now live.

A second access modification command 36 is a block death command indicated by process block 58. This access modification command 36 is issued when the liveness inference circuit 40 receives metadata 15 of index table 42 or free list 44 indicating that a block has just died since the last metadata 15. In this case, the read/write modification circuit 45 instructs the WRITE circuit 16 to shred the block, indicated by process block 60, by multiple overwrites of both the track at the block location and the gutter areas, such as may only be performed by local control of the disk mechanism.

When the read/write modification circuit 45 receives a shred instruction, it queues the shred instruction in a buffer 62 and establishes a low priority thread to perform the shred only if no read or write instructions arrived within a predetermined period of time. This delayed shredding allows sequential ordering of the writes and eliminates the number of shreds if the same block is shredded multiple times. This ability to delay overwrites is enabled by a conservative shredding policy that will now be described.

A third access modification command 36, as indicated by process block 64, is issued if the liveness inference circuit 40 detects a "generational" death indicated by a change in a block 14 reflected in a new entry into liveness table 34. In this case, the read/write modification circuit 45 instructs the READ circuit 18 to read the data which is saved by the read/write modification circuit in the buffer 62. The read/write modification circuit 45 then instructs the WRITE circuit 16 to shred the block per process block 68, and then to rewrite the saved data to the block per process block 70. If the shredding involves off-track writing, the WRITE circuit 16 may be modified to permit this operation.

The generational death access modification command 36 ensures that if a change in a logical data file resulted in a change of data of the block, then the previous data is fully erased. However, because of asynchrony in the writing of data and metadata, it is possible that the new data of the implicated block 14 has not yet been written to the storage device 10 by the file system 24 even though the change has been detected from an updating of the index table 42. For that reason, the liveness inference circuit 40 at this time sets a bit in a suspicious block table 52 per process block 72, (indicated in the figure by a check mark). This bit indicates that there is some uncertainty as to whether the final data has arrived in the block and thus as to whether the shredding of the previous data was successful.

A fourth access modification command 36, as indicated by process block 74, is issued upon any write of a block 14 where the block is indicated to be live and the bit is set in suspicious block table 52. In this case, the liveness inference circuit 40 issues a shred instruction to the WRITE circuit 16 per process block 76 and, then writes the new data per process block 78, and then clears the bit in suspicious block table 52 per process block 80. If the bit is not set in suspicious block table 52, the write proceeds per the normal write access modification command 36 of process block 54 described above.

These access modification commands 36 ensure secure deletion of data without explicit delete instructions from the file system 24, but require that the file system obey either of the properties of "block exclusivity" or "data/metadata coupling". Block exclusivity requires that for every block 14, there is at most one allocated copy of the data of the block in the file system 24, and that the file system 24 employ adequate locking to prevent any update to the copy of this data in the file system 24 while the data is being written to the storage device 10. This property holds for some file systems such as ext2 and VFAT; however, ext3 does not conform to this property. On the other hand, ext3 provides for data/metadata coupling which requires that metadata and the block updates reflected in that metadata be sent as a single transaction that is not committed until it is complete, thereby eliminating disconnect between the metadata and the actual block data Minor changes may be required in some file systems 24 in order to provide optimal use of this technique. However, these changes are extremely limited in scope. For ext2 , deletions can be undetectable in cases where a file has been truncated in which case the version number of the metadata is not incremented. This can be remedied by simply changing the version number to increment in these situations. The second problem with ext2 results from the use of indirect blocks to hold additional metadata linked to the primary metadata. This ambiguity with respect to the indirect blocks may be remedied by ensuring a writing of metadata before the file system allocates an indirect block and immediately after the file system frees an indirect block. These changes require approximately twelve lines of code change in ext2 .

A similar problem arises with VFAT which provides no version information. This can be remedied by adding a generation number to the VFAT entries which requires approximately 29 lines of code change.

The ext3 file system 24 will work without modification in its data journaling mode. For the ordered and writeback modes understood to those in the art, ext3 may be made to log a list of blocks that were allocated in a transaction to enable accurate tracking of deletes. This change requires approximately 95 lines of code.

Figure 4:
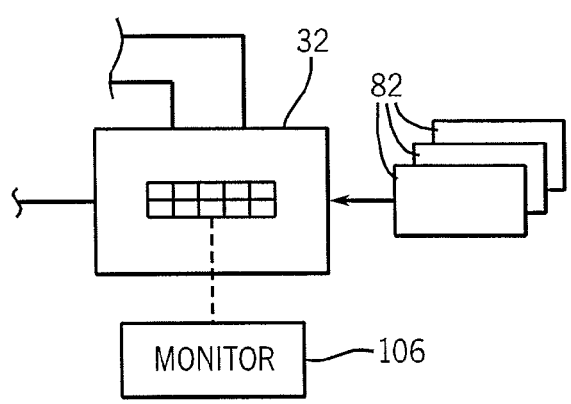
FIG. 4 is a fragmentary view of the controller of FIG. 1 showing the use of multiple file system semantics templates to allow the storage device to work with different file systems and the addition of a security monitor for use in providing additional computer security.

Referring now to FIG. 4 in a practical implementation, the access monitor circuit 32 may have access to a variety of file system semantic templates 82, for example, providing for the semantic protocols of common file systems such as ext2 , ext3 and VFAT, and may select among these semantic templates 82 for the purpose of determining the location and contents of the metadata of index table 42 and free list 44 shown in FIG. 4. The selection process may, for example, be during the normal commissioning of the storage device 10 in which the file structure is determined, for example, using a program for commissioning executing on the computer 28.

Figure 5:
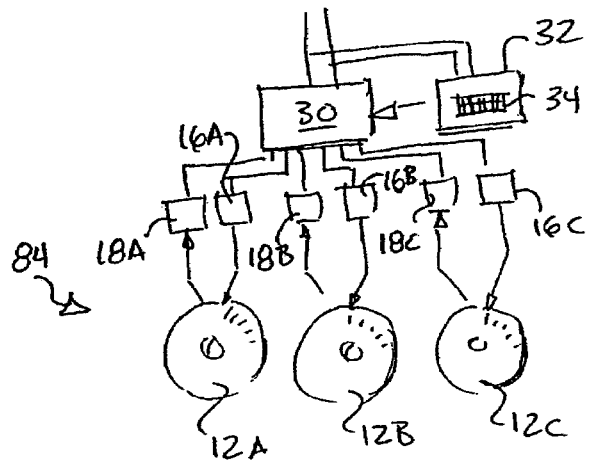
FIG. 5 is figure similar to that of FIG. 1 showing use of the invention on a RAID system.

Referring now to FIG. 5, the present invention may be readily adapted as will be understood to those of ordinary skill in the art from the above description to a redundant array of independent disks RAID 84 having multiple independent WRITE circuits 16A-16C and READ circuits 18A-18C, each associated with different storage mediums 12A-12C. In this case, the free list 44 contained in the access monitor circuit 32 may be made available to the media access circuit 30 for optimization purposes, for example, the implementation of a dynamic adaptive RAID scheme such as the Hewlett-Packard auto-RAID system which utilizes free space to store data in RAID-I layout and migrates the data to RAID-5 when it runs out of space. Knowledge of block death can make such schemes more effective.

The free list 44 may also be used to optimize the disks, either for a RAID system or a standard system, to place the blocks in an optimal location with respect to rotation of the media by co-locating live blocks together to minimize read head seeks. Correspondingly, dead blocks may be used to hold rotational replicas of the data for minimizing seek times.

Figure 6:
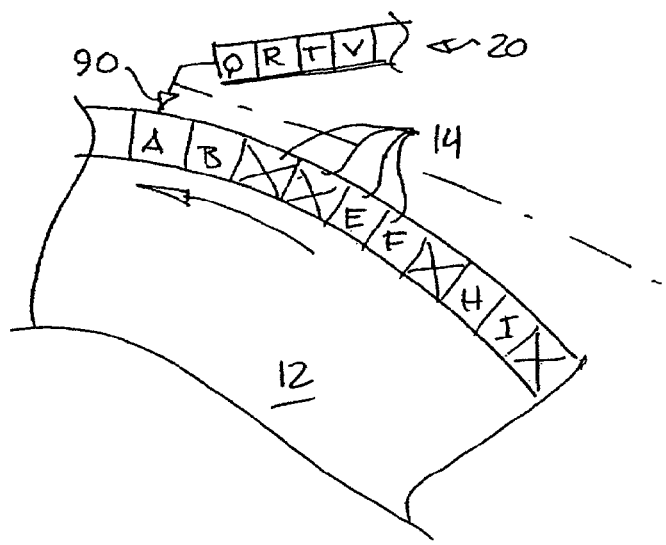
FIG. 6 is a schematic representation of a portion of the media of FIG. 1 showing the writing of a logical file to remapped blocks on the disk according to one optimization made possible by the present invention.
Figure 6:
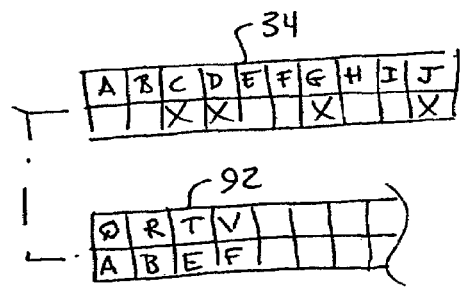

Referring now to FIG. 6, knowledge of the liveness of blocks 14 can be used in an eager writing system in which the read/write modification circuit 45 remaps blocks 15 of the write and read instructions 20 to free blocks closer to the disk read/write head to minimize write times. For example, a write instruction 20 may request the writing of data to blocks Q, R, T and V at the time where a read/write head 90 is located near block A on storage medium 12. As is understood in the art, the access monitor circuit 32 may make use of a remapping table 92, mapping the blocks 15 of the instruction 20 (i.e., Q, R, T and V), to new blocks (i.e., A, B, E and F) based on knowledge that blocks C and D are live per the liveness table 34. In this case, the data of instruction 20 may be written to blocks A, B, E and F, skipping blocks C and D.

A similar approach, informed by knowledge of block liveness, can allow only live blocks to be read out, for example, in an intelligent pre-fetching of data from the disk to a computer cache or in backing up data.

Referring again to FIG. 4, the importation of metadata to the device level allows an additional level of security to be implemented in which a security monitor 100 monitors reads and writes such as deletes or truncates of log files to detect patterns which require liveness information.

The instructions implemented in each of the process blocks of FIG. 3 may be allocated flexibly between the access monitor circuit 32 and the media access circuit 30. Generally each of the liveness inference circuit 40, the media access circuit 30, and the read/write modification circuit 45 may be implemented as discrete circuitry or as firmware or as combinations of circuitry and firmware as will be understood to those of ordinary skill in the art.

It is specifically intended that the present invention not be limited to the embodiments and illustrations contained herein, but include modified forms of those embodiments including portions of the embodiments and combinations of elements of different embodiments as come within the scope of the following claims.

We claim:

1. A computer storage device for use with a file system managing logical data files of data, the computer storage device comprising:
   a storage medium having a plurality of blocks storing data and metadata, the metadata mapping data of logical data files to blocks;
   an interface accepting instructions from the file system to read data from blocks and write data to blocks;
   a controller implementing:
   (a) an access monitor circuit communicating with the interface to identify metadata stored on the storage medium and to determine from the metadata whether blocks have died; and
   (b) a media access circuit changing writing of data to a given block or reading of data from a given block based on whether the block has died as determined by the controller.

2. The computer storage device of claim 1 wherein the access monitor circuit, in determining whether blocks have died, identifies blocks that have a change in the files with which they are associated.

3. The computer storage device of claim 1 wherein the media access circuit shreds a block to erase previous data of the block when the access monitor circuit determines that the block has died.

4. The computer storage device of claim 3 wherein the access monitor circuit may further determine that a logical file associated with a block has changed and wherein the media access circuit saves data of the given block, then shreds the given block, and then rewrites the saved data to the given block, when the access monitor circuit determines that a logical file associated with the given block has changed.

5. The computer storage device of claim 4 wherein the media access circuit, after the rewriting of the saved data, performs a second shredding of the given block before a subsequent writing of data to the given block.

6. A computer storage device for use with a file system managing logical data files of data, the computer storage device comprising:
   a storage medium having a plurality of blocks storing data and metadata, the metadata mapping data of logical data files to blocks;
   an interface accepting instructions from the file system to read data from blocks and write data to blocks;
   a controller implementing:
   (a) an access monitor circuit communicating with the interface to identify metadata stored on the storage medium and to determine from the metadata and from subsequent access to data blocks other than the metadata, whether blocks are live or dead; and
   (b) a media access circuit changing writing of data to a given block or reading of data from a given block based on whether the block has died as determined by the controller.

7. The computer storage device of claim 6 wherein the media access circuit shreds a block to erase previous data of the block when the access monitor circuit determines that the block has changed from live to dead.

8. The computer storage device of claim 6 wherein the media access circuit remaps a writing of data associated with an instruction from a block designated by the instruction to a different block determined by the access monitor circuit to be live and having lower latency.

9. The computer storage device of claim 8 wherein the different block is a dead block closer to a disk read head than the block designated by the instruction.

10. The computer storage device of claim 8 wherein the different block is a dead block closer to at least one other block having data of a logical file associated with the instruction than the block designated by the instruction.

11. The computer storage device of claim 6 wherein the media access circuit, during prefetching of blocks, reads only live blocks as determined by the access monitor circuit.

12. The computer storage device of claim 6 wherein the metadata is a file index relating blocks to logical data files and a bitmap indicating a status of each block as allocated to a logical file or not allocated to a logical file.

13. The computer storage device of claim 6 wherein the storage medium is a magnetic disk.

14. The computer storage device of claim 6 wherein the storage medium is a RAID system having multiple independent disk drives.

15. The computer storage device of claim 14 wherein the media access circuit reorganizes data among the multiple independent disk drives based on a determination by the access monitor circuit as to which blocks of the multiple independent disk drives are live.

16. The computer storage device of claim 6 wherein the interface further accepts free instructions and wherein the media access circuit responds to the free instructions to shred a block designated in the free instruction.

17. The computer storage device of claim 6 further including a monitor for monitoring changes of the whether data is alive to detect a security problem.

18. The computer storage device of claim 6 further including:
  a plurality of file system semantics templates describing the storage of metadata by different file systems; and
  wherein the access monitor circuit identifies metadata stored on the storage medium based on a selected file system semantics template.

19. A access monitor circuit for a computer storage device for use with a file system managing logical data files of data, the computer storage device including a storage medium having a plurality of blocks storing data and metadata, the metadata mapping data of logical data files to blocks and an interface accepting instructions from the file system to read data from blocks and write data to blocks,
  the access monitor circuit comprising:
  a access monitor circuit communicating with the interface to identify metadata stored on the storage medium and to determine from the metadata whether blocks are live or dead or changed; and
  media access circuit changing writing of data to a given block or reading of data from a given block based on whether the block is live as determined by the access monitor circuit.

20. A method of operating a computer storage device for use with a file system managing logical data files of data, the computer storage device including a storage medium having a plurality blocks storing data and metadata, the metadata mapping data of logical data files to blocks and an interface accepting instructions from the file system to read data from blocks and write data to blocks, the method comprising the steps of:
  (a) identifying with the computer storage device, metadata stored on the storage medium;
  (b) determine from the metadata whether blocks have died; and
  (c) changing writing of data to a given block or reading of data from a given block based on whether the block is live as determined at step (b).

21. A access monitor circuit for a computer storage device for use with a file system managing logical data files of data, the computer storage device including a storage medium having a plurality of blocks storing data and metadata, the metadata mapping data of logical data files to blocks and an interface accepting instructions from the file system to read data from blocks and write data to blocks,
  the access monitor circuit comprising:
  a access monitor circuit communicating with the interface to identify metadata stored on the storage medium and to determine from the metadata whether blocks are live; and
  media access circuit changing remapping a writing of data associated with an instruction from a block designated by the instruction to a different block determined by the access monitor circuit to be live and having lower latency.

22. The computer storage device of claim 21 wherein the different block is a dead block closer to a disk read head than the block designated by the instruction.

23. The computer storage device of claim 21 wherein the different block is a dead block closer to at least one other block having data of a logical file associated with the instruction than the block designated by the instruction.

24. A computer storage device for use with a file system managing logical data files of data, the computer storage device comprising:
  a storage medium having a plurality of blocks storing data and metadata, the metadata mapping data of logical data files to blocks;
  an interface accepting instructions from the file system to read data from blocks and write data to blocks;
  a plurality of file system semantics templates describing the storage of metadata by different file systems;
  a controller implementing:
  a) an access monitor circuit communicating with the interface to identify metadata stored on the storage medium based on a selected file system semantics template and to determine from the metadata whether blocks have died; and
  b) a media access circuit changing writing of data to a given block or reading of data from a given block based on whether the block has died as determined by the controller.

* * * * *

UNITED STATES PATENT AND TRADEMARK OFFICE
CERTIFICATE OF CORRECTION

PATENT NO. : 7,536,521 B2
APPLICATION NO. : 11/535757
DATED : May 19, 2009
INVENTOR(S) : Sivathanu et al.

It is certified that error appears in the above-identified patent and that said Letters Patent is hereby corrected as shown below:

IN THE SPECIFICATION

| | |
|---|---|
| Col. 2, line 62 | Replace "when is" with --when--. |
| Col. 4, lines 19 and 20 | Replace "a access" with --an access--. |
| Col. 4, line 24 | Add --a-- before the word "detailed". |
| Col. 4, line 39 | Add --a-- before the word "figure". |
| Col. 5, line 31 | Replace "varying" with --vary--. |
| Col. 5, line 39 | Replace "VF A T" with --VFAT--. |
| Col. 6, line 1 | Replace "aliveness" with --a liveness--. |
| Col. 9, line 9 | Replace "RAID-I" with --RAID-1--. |

IN THE CLAIMS

CLAIM 17
Col. 11, line 18    Replace "of the" with --in--.

CLAIM 19
Col. 11, line 27    Replace "A access" with --An access--.

CLAIM 19
Col. 11, line 35    Replace "a access" with --an access--.

UNITED STATES PATENT AND TRADEMARK OFFICE
CERTIFICATE OF CORRECTION

PATENT NO. : 7,536,521 B2
APPLICATION NO. : 11/535757
DATED : May 19, 2009
INVENTOR(S) : Sivathanu et al.

It is certified that error appears in the above-identified patent and that said Letters Patent is hereby corrected as shown below:

CLAIM 20
    Col. 11, line 46         Add --of-- after the word "plurality".

CLAIM 21
    Col. 12, line 6         Replace "A access" with --An access--.

CLAIM 21
    Col. 12, line 14         Replace "a access" with --an access--.

Signed and Sealed this

Eighth Day of December, 2009

David J. Kappos
*Director of the United States Patent and Trademark Office*